(12) United States Patent
Katiyar et al.

(10) Patent No.: US 9,952,797 B2
(45) Date of Patent: Apr. 24, 2018

(54) SYSTEMS, METHODS AND DEVICES FOR ADDRESSING DATA BLOCKS IN MASS STORAGE FILING SYSTEMS

(71) Applicant: NetApp, Inc., Sunnyvale, CA (US)

(72) Inventors: Manish Katiyar, Santa Clara, CA (US); Anathan Subramanian, Sunnyvale, CA (US); Subramaniam Periyagaram, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 239 days.

(21) Appl. No.: 14/815,601

(22) Filed: Jul. 31, 2015

(65) Prior Publication Data

US 2017/0031614 A1 Feb. 2, 2017

(51) Int. Cl.
*G06F 3/06* (2006.01)

(52) U.S. Cl.
CPC .......... *G06F 3/0643* (2013.01); *G06F 3/0604* (2013.01); *G06F 3/067* (2013.01); *G06F 3/0665* (2013.01)

(58) Field of Classification Search
CPC .... G06F 3/0643; G06F 3/0604; G06F 3/0665; G06F 3/067
See application file for complete search history.

(56) References Cited

U.S. PATENT DOCUMENTS

| | | | |
|---|---|---|---|
| 5,819,292 A | 10/1998 | Hitz | |
| 6,119,205 A | 9/2000 | Wicki et al. | |
| 6,289,356 B1 | 9/2001 | Hitz | |
| 6,725,337 B1 | 4/2004 | Tan et al. | |
| 7,072,916 B1 | 7/2006 | Lewis et al. | |
| 7,099,955 B1 | 8/2006 | Gregg et al. | |

(Continued)

FOREIGN PATENT DOCUMENTS

| | | |
|---|---|---|
| CN | 1877540 A | 12/2006 |
| CN | 1293477 C | 1/2007 |

(Continued)

OTHER PUBLICATIONS

Bill von Hagen, "Journaling Filesystems for Linux", May 17th, 2002, Pearson Education, Informit, p. 4 http://www.informit.com/articles/article.aspx?p=26885&segNum=5.*

(Continued)

*Primary Examiner* — Eric Cardwell
(74) *Attorney, Agent, or Firm* — Klein, O'Neill & Singh, LLP

(57) ABSTRACT

Presented herein are mass data storage networks, file system protocols, non-transitory machine readable devices, and methods for storing data blocks in mass data storage systems. Methods for storing data blocks in a file system are disclosed which include: receiving by storage controller of the data storage system a request to write a data file to a system storage module; determining whether the data file includes a sub-K data chunk that is less than approximately four kilobytes; identifying a packed block that stores a plurality of sub-K data chunks and has sufficient storage space available to store the sub-K data chunk; and placing, by the storage controller in the packed block, the sub-K data chunk and a corresponding data length and a respective offset identifying a location of the sub-K data chunk in the packed block.

20 Claims, 4 Drawing Sheets

(56) References Cited

U.S. PATENT DOCUMENTS

| | | |
|---|---|---|
| 7,155,460 B2 | 12/2006 | McGovern |
| 7,162,486 B2 | 1/2007 | Patel |
| 7,203,796 B1 | 4/2007 | Muppalaneni et al. |
| 7,231,412 B2 | 6/2007 | Hitz |
| 7,305,581 B2 | 12/2007 | Geng et al. |
| 7,366,834 B2 | 4/2008 | McGovern |
| 7,590,807 B2 | 9/2009 | McGovern |
| 7,593,996 B2 | 9/2009 | Gole et al. |
| 7,610,348 B2 | 10/2009 | Kisley et al. |
| 7,624,156 B1 | 11/2009 | Hefty et al. |
| 7,827,201 B1* | 11/2010 | Gordon ............ G06F 17/30607 707/792 |
| 7,870,356 B1 | 1/2011 | Veeraswamy et al. |
| 7,917,597 B1 | 3/2011 | Lentini |
| 7,930,493 B1 | 4/2011 | McGovern |
| 8,041,987 B2 | 10/2011 | Allen et al. |
| 8,233,380 B2 | 7/2012 | Subramanian et al. |
| 8,244,825 B2 | 8/2012 | Subramanian et al. |
| 8,244,826 B2 | 8/2012 | Benner et al. |
| 8,332,362 B2 | 12/2012 | McGovern |
| 8,352,431 B1 | 1/2013 | Protopopov et al. |
| 8,484,164 B1 | 7/2013 | Sivakumar et al. |
| 8,566,371 B1 | 10/2013 | Bono et al. |
| 8,577,986 B2 | 11/2013 | Pinkerton et al. |
| 8,595,313 B2 | 11/2013 | Weber et al. |
| 8,600,949 B2 | 12/2013 | Periyagaram |
| 8,627,136 B2 | 1/2014 | Shankar et al. |
| 8,775,718 B2 | 7/2014 | Kanevsky et al. |
| 2002/0071386 A1 | 6/2002 | Gronke |
| 2002/0083037 A1 | 6/2002 | Lewis et al. |
| 2002/0124137 A1 | 9/2002 | Ulrich et al. |
| 2003/0158863 A1 | 8/2003 | Haskin et al. |
| 2003/0191911 A1 | 10/2003 | Kleinschnitz et al. |
| 2004/0010545 A1 | 1/2004 | Pandya |
| 2004/0030846 A1 | 2/2004 | Armangau et al. |
| 2005/0015459 A1 | 1/2005 | Gole et al. |
| 2005/0198113 A1 | 9/2005 | Mohamed et al. |
| 2005/0246397 A1 | 11/2005 | Edwards |
| 2006/0112151 A1 | 5/2006 | Manley et al. |
| 2006/0123211 A1 | 6/2006 | Derk et al. |
| 2006/0206536 A1 | 9/2006 | Sawdon et al. |
| 2006/0236063 A1 | 10/2006 | Hausauer et al. |
| 2006/0248088 A1 | 11/2006 | Kazar et al. |
| 2007/0038821 A1 | 2/2007 | Peay |
| 2007/0078940 A1 | 4/2007 | Fineberg et al. |
| 2007/0162641 A1 | 7/2007 | Oztaskin et al. |
| 2007/0208820 A1 | 9/2007 | Makhervaks et al. |
| 2007/0282967 A1 | 12/2007 | Fineberg et al. |
| 2007/0288247 A1 | 12/2007 | MacKay |
| 2007/0288921 A1 | 12/2007 | King et al. |
| 2007/0294321 A1 | 12/2007 | Midgley et al. |
| 2007/0300008 A1 | 12/2007 | Rogers et al. |
| 2008/0126509 A1 | 5/2008 | Subramanian et al. |
| 2008/0148281 A1 | 6/2008 | Magro et al. |
| 2008/0183882 A1 | 7/2008 | Flynn et al. |
| 2009/0204969 A1 | 8/2009 | Abadi et al. |
| 2009/0268903 A1 | 10/2009 | Bojinov et al. |
| 2009/0276514 A1 | 11/2009 | Subramanian |
| 2009/0319772 A1 | 12/2009 | Singh et al. |
| 2010/0077161 A1 | 3/2010 | Stoakes et al. |
| 2010/0131466 A1 | 5/2010 | Chen |
| 2010/0241614 A1 | 9/2010 | Shaull et al. |
| 2011/0231375 A1 | 9/2011 | Cannon et al. |
| 2012/0042202 A1 | 2/2012 | Wenzel |
| 2012/0259810 A1 | 10/2012 | Kopylovitz et al. |
| 2014/0122892 A1 | 5/2014 | Corbett et al. |
| 2014/0344539 A1 | 11/2014 | Gordon et al. |

FOREIGN PATENT DOCUMENTS

| | | |
|---|---|---|
| CN | 101183383 A | 5/2008 |
| CN | 102012852 A | 4/2011 |
| WO | WO-2008021528 A2 | 2/2008 |

OTHER PUBLICATIONS

Office Action, dated Mar. 16, 2016, issued in Chinese Patent Application No. 201280048347.2, 12 pages.

International Preliminary Report on Patentability for Application No. PCT/US2012/070962 dated Jun. 24, 2014, 6 pages.

International Search Report and Written Opinion for Application No. PCT/US2012/070962 dated Mar. 19, 2013, 9 pages.

Supplementary European Search Report for Application No. EP12859970 dated Jul. 28, 2016, 7 pages.

Non-Final Office Action on related U.S. Appl. No. 13/331,978 dated Apr. 23, 2013.

Final Office Action on related U.S. Appl. No. 13/331,978 dated Oct. 29, 2013.

Non-Final Office Action on related U.S. Appl. No. 13/331,978 dated Mar. 13, 2014.

Final Office Action on related U.S. Appl. No. 13/331,978 dated Jul. 3, 2014.

Non-Final Office Action on related U.S. Appl. No. 13/331,978 dated Jun. 2, 2015.

Final Office Action on related U.S. Appl. No. 13/331,978 dated Aug. 28, 2015.

Non-Final Office Action on related U.S. Appl. No. 13/331,978 dated Oct. 29, 2015.

Final Office Action on related U.S. Appl. No. 13/331,978 dated Jan. 11, 2016.

Non-Final Office Action on related U.S. Appl. No. 13/331,978 dated Jun. 8, 2016.

Non-Final Office Action on related U.S. Appl. No. 14/848,482 dated Nov. 15, 2016.

Notice of Allowance on related U.S. Appl. No. 14/848,482 dated Mar. 21, 2017.

Non-Final Office Action on related U.S. Appl. No. 14/815,662 dated Jun. 19, 2017.

Final Office Action on related U.S. Appl. No. 14/815,662 dated Dec. 28, 2017.

* cited by examiner

SYSTEMS, METHODS AND DEVICES FOR ADDRESSING DATA BLOCKS IN MASS STORAGE FILING SYSTEMS

TECHNICAL FIELD

The present disclosure relates generally to mass data storage networks and data storage filing systems. More particularly, aspects of this disclosure relate to data storage network configurations, file system protocols, and methods for addressing data blocks in data filing systems.

BACKGROUND

Mass data storage systems are used for many purposes, including storing user and system data for data processing, backup and transmission applications. A typical mass storage system includes numerous computer disk drives that cooperatively store data, for example, as a single logically contiguous storage space, often referred to as a volume or a logical unit. One or more such volumes/logical units may be configured in a storage system. The storage system therefore performs much like that of a single computer disk drive when viewed by a host computer system. For example, the host computer system can access data of the storage system much like it would access data of a single internal disk drive, in essence, without regard to the substantially transparent underlying control of the storage system.

A mass storage data system may include one or more storage modules with each individual storage module comprising multiple disk drives coupled to one or more storage controllers. In one common configuration, a storage module may be coupled through its storage controller(s) directly to a host system as a standalone storage module. Typical storage controllers include significant cache memory capacity to improve performance of the I/O operation. Write requests may be completed when the supplied data is written to the higher speed cache memory. At some later point, the data in cache memory may be flushed or posted to the persistent storage of the storage modules. In a standalone configuration, it is common to enhance reliability and performance by providing a redundant pair of storage controllers. The redundant pair of controllers enhances reliability in that an inactive storage controller may assume control when an active controller is sensed to have failed in some manner.

In another standard system configuration, a storage module may be part of a larger storage network or "cluster." For a cluster-type architecture, multiple storage modules and corresponding storage controllers are typically coupled through a switched network communication medium, known as a "fabric," to one or more host systems. This form of storage module system is often referred to as a Storage Area Network (SAN) architecture and the switching fabric is, concomitantly, referred to as a SAN switching fabric. In such a clustered configuration, it is common that all of the storage controllers exchange coherency information and other information for load balancing of I/O request processing and other control information. Such control information may be exchanged over the same network fabric that couples the storage controllers to the host systems (e.g., a "front end" connection) or over another fabric that couples the storage controllers to the storage modules (e.g., a "back-end" connection).

A network storage appliance (e.g., a storage server) is typically a discrete special-purpose computer that provides file services relating to the organization of information on the storage devices of a mass data storage system. The network storage appliance, or "filer," includes integrated software (firmware) and an operating system that implements a file system to logically organize information, for example, as a hierarchical structure of directories and files on the storage devices (e.g., storage disks). Each "on-disk" file may be implemented as a set of disk blocks configured to store information, such as text; the directory, by comparison, may be implemented as a specially formatted file in which information about other files and directories are stored.

On-disk format representation of the some file systems is block-based using, for example, four kilobyte (KB) blocks (4K block) and index nodes to describe the files. Index nodes, which are informally referred to as "modes," are data structures used to store information, such as metadata, about a file. That is, the information contained in a typical mode may include, e.g., file ownership data, file access permission data, file size, file type, and on-disk location of the data for the file. The file system uses an identifier with an mode number, known as a "file handle," to retrieve an mode from a disk. The file system also uses metadata files to store metadata describing the layout of its file system. An example of on-disk format structure of one standard file system is described in U.S. Pat. No. 5,819,292 to David Hitz et al., which is incorporated herein by reference in its entirety and for all purposes.

Presently, some filing systems address disk blocks at a granularity of four kilobytes per block. In effect, these file systems will allocate a 4K block and consume at least 4 KB worth of disk space for any data file even if the 4K block contains only a few bytes of valid data. For instance, standard workloads almost invariably fail to align with 4 KB file sizes, which means that, irrespective of file size, tail ends of the files are always less than 4 KB but nevertheless each consumes an entire 4K block. As another example, small file home directory workloads, such as those utilized in social networking environments (e.g., small (140-character) messages, microblogs, thumbnails, etc.), will tie up an entire 4K block for each data file. Likewise, for files with moderate to high compressible data, the compressed data is oftentimes less than 4 KB (e.g., in the order of 1 KB); nevertheless, an entire 4K block is allocated for the compressed data. Such practices, when applied across the entire data storage system, lead to an inefficient utilization of physical storage space. There is therefore a need for a file system protocol that more efficiently and effectively utilizes space within each disk block to store relevant data.

Figure 1:
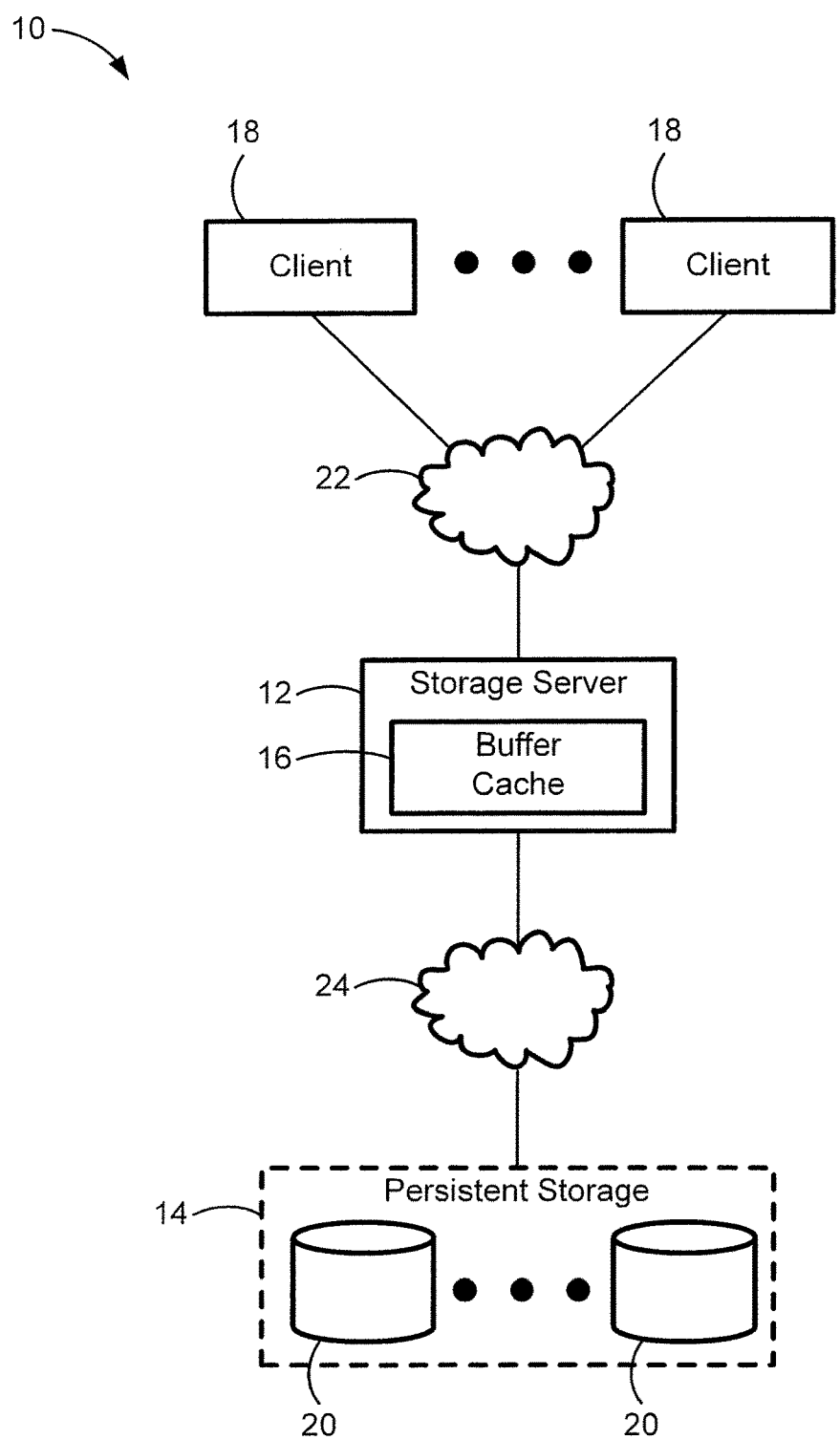
FIG. 1 is a schematic diagram illustrating a representative networked mass data storage file system in accordance with aspects of the present disclosure.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

This disclosure is susceptible of embodiment in many different forms. There are shown in the drawings, and will herein be described in detail, representative embodiments with the understanding that the present disclosure is to be considered as an exemplification of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed or logically prohibited: the singular includes the plural and vice versa; and the words "including" or "comprising" or "having" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Aspects of this disclosure are directed to file system protocols for identifying four kilobyte (KB) blocks of data ("4K block") in the system that are storing less than 4 KB chunks of data (e.g., less than 4096 bytes of data), and relocating these sub-4K data chunks to a single 4K block instead of allocating an entire 4K block individually for each data chunk. Disclosed, for example, is a file system protocol that identifies files storing chunks of data that are less than 4 KB, then enqueues or "collects" candidate blocks to a packing list, and places or "copies" selected sub-4K chunks along with an offset and data length to reside in a "packed" block. With such a scheme, the contents of multiple blocks can reside in a single 4K block and can share the same disk block as long as the disk block is not fully packed to 4096 bytes. Such individual blocks stored in a packed block are referred to as "chunks." Some of the disclosed embodiments are directed to new storage efficiency techniques that collect sub-4 KB block chunks and pack them into a single 4K block to efficiently utilize physical storage space at the physical volume block number (PVBN) level to help ensure that savings in snapshots can be realized. While block sharing among multiple virtual disk containers (also known as "virtual volumes") is envisioned, complexity can be reduced by only sharing blocks within the same virtual volume.

For at least some embodiments, each allocated block in the system is provided with a unique signature, also known as "lost-write context" of the block. Lost-write context is a manner of detecting if a requested write has failed (e.g., an existing protection mechanism within the file system to identify malfunctioning server disks). Along with the offset and length for each chunk, the FILE SYSTEM protocol will store the lost-write context for each chunk in the block. This metadata information for each chunk is stored as an array at the start of the packed block. Any subsequent read destined for a chunk looks up the header for the signature match and, once the match has been found, it returns the requested data to the client from the stored offset and length. For at least some embodiments, an aggregate level "refcount" is maintained for all such packed blocks. Each packed block in the aggregate is tracked by a bitmap, which informs whether that block is in use. Since a packed block is used by multiple blocks, the refcount will indicate whether the block is in use as well as how many data chunks occupy the block. For at least some embodiments, only when all of the chunks in the packed block have been freed or overwritten can the packed block itself be freed. Header in the block for each chunk describes the data and is used to reconstruct the data back when needed. This enables the file system to address blocks at sub-4K granularity, and also helps in efficiently utilizing the physical space of disks.

Referring now to the drawings, wherein like reference numerals refer to like features throughout the several views, there is shown in FIG. 1 a representative mass data storage file system, designated generally at 10, for performing filing operations in accordance with aspects of the present disclosure. The system 10 includes, but is certainly not limited to, one or more host storage servers 12 communicatively coupled to one or more data storage modules 14, each of which includes, for example, multiple non-volatile mass storage devices 20. Also communicatively coupled to the host storage server(s) 12 through a network interconnect 22 are one or more clients 18. The network interconnect 22 may be, for example, a local area network (LAN), a wireless local area network (WLAN), a wide area network (WAN), a metropolitan area network (MAN), a global area network, a distributed computer system, such as the Internet, a Fibre Channel fabric, or any combination of such interconnects. Each of the clients 18 may take on various forms including, as some non-limiting examples, a server-class computer, a networked workstation, a personal computer (PC), a handheld computing device, and the like. It should be readily understood that the system 10 illustrated in FIG. 1 is merely provided as an exemplary application by which the various inventive aspects and features of this disclosure can be applied. Moreover, only selected components of the system 10 have been shown and will be described in additional detail hereinbelow. Nevertheless, the systems and devices discussed herein can include numerous additional and alternative features, and other well-known peripheral components, for example, for carrying out the various methods and functions disclosed herein.

Each storage server 12 is operable, in whole or in part, as a network storage appliance or filer configured as a special-purpose computer to manage storage of data in at least one of the one or more storage modules 14. Storage server 12 receives and responds to various read requests and/or write requests from one or more of the clients 18 directed to data stored in, or to be stored in, the storage module(s) 14. A storage server 12 communicates with a storage module 14 over a network interconnect 24. Server 12 may comprise a central processing unit, a main memory device, a network adapter, and a storage adapter, all of which are interconnected by a system bus. The server 12 also includes an operating system that implements the herein described file system to logically organize information, for example, as a hierarchical structure of directories and files on the disks. Each server can be implemented on one or more server class computers, which can be subcomponents of a computer hardware server system, with sufficient memory, data storage, and processing power and, in some embodiments, the capabilities to run a server class operating system (e.g., GNU/Linux, SUN Solaris, Microsoft Windows OS, etc.). The servers can each be part of a logical group of one or more servers, such as a server farm or server network.

As is typical in large-scale systems, the application software can be implemented in components, with different components running on different server computers, on the same server, or any logical combination thereof. Interconnect 24 may support any of various types of communication protocols, such as Ethernet, iWarp, Fibre Channel Virtual Interface (FCVI), InfiniBand, Peripheral Component Interconnect express (PCIe), and the like. Like interconnect 22, interconnect 24 may comprise a LAN, a WLAN, a WAN, a MAN, a global area network, a distributed computer system, a Fibre Channel fabric, or any combination thereof. Interconnects 22 and 24 can each be a wired or a wireless network, or a combination of wired and wireless technology. Communication can take place through any now-known or hereinafter developed media, such as telephone lines (e.g., Dial-Up), local area network (LAN) or wide area network (WAN) links (e.g., Ethernet, T(X) lines, X.25, etc.), broadband connections (e.g., Integrated Service Data Network (ISDN), Frame Relay, etc.), wireless links (e.g., infrared, Bluetooth®, WiFi or WLAN), cellular networks, and so on.

Mass storage devices 20 of each storage module 14 can take on various non-known or hereinafter developed forms, including non-volatile solid-state memory, such as flash memory or other read-only memory (ROM); alternatively, a storage module may contain conventional electronic, magnetic or optical disks or tape drives. These mass storage devices 20 can be organized as one or more Redundant Array of Inexpensive/Independent Disk/Device (RAID) groups, in which case the storage server(s) 12 accesses the storage module(s) 14 using one or more RAID algorithms. The illustrated storage server 12 also includes an optional internal buffer cache 16, which can be implemented as DRAM, for example, or, the buffer cache 16 can be implemented as non-volatile solid-state memory, including flash memory.

The storage server(s) 12 may provide file-level data access service to clients 18, such as commonly done by a storage server in a network attached storage (NAS) environment (i.e., a "filer"), or block-level data access service such as commonly done by a storage server in a storage area network (SAN) environment. A storage server 12 may be operable to provide both file-level data access service and block-level data access service, for some network configurations. Further, although the storage server 12 is illustrated as a single unit in FIG. 1, the storage server 12 can have a distributed architecture. For example, the storage server 12 can include a physically separate network element and data element that communicate over a fabric interconnect.

Figure 2:
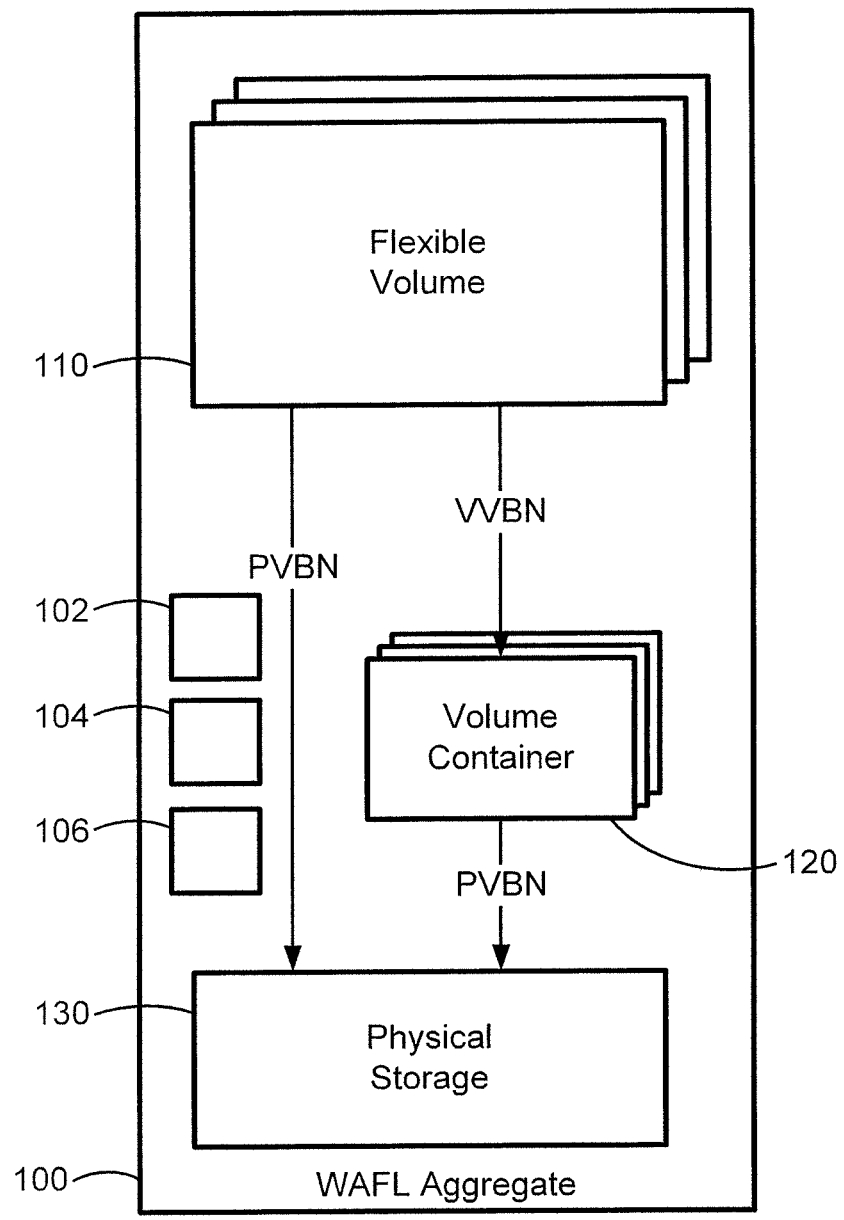
FIG. 2 is a schematic diagram illustrating a representative filing system configuration in accordance with aspects of the present disclosure.

FIG. 2 schematically depicts a file system aggregate 100 that is representative of a file system configuration. The aggregate 100 can be managed by a network storage appliance, such as storage server 12 of FIG. 1, or other storage system filer. As described further herein, segments of the aggregate 100 can be implemented through an operating system software layer having an on-disk format representation that is block-based using, e.g., 4 kilobyte data blocks (4K block) and using modes to describe the files. Aggregate 100 of FIG. 2 includes, for example, one or more flexible volumes 110, one or more volume containers 120, and physical storage 130. The aggregate 100 can be representative of a physical storage container that can store data in the file system. Flexible volume 110 is a logical volume that provides for virtualization of the allocation of volumes on physical storage 130. By this means, multiple, independently managed flexible volumes 110 can share the same physical storage (e.g., physical storage 130). The virtualization includes mapping between virtual volume block numbers (VVBNs), which are used by flexible volume 110, and physical volume block numbers (PVBNS), which are used by the aggregate 100 to access data stored in physical storage 130. A PVBN typically refers to disk blocks that have been abstracted into a single linear sequence in the aggregate. Each volume container 120 corresponds to a flexible volume 110. Volume container 120 contains all the data blocks for a corresponding flexible volume 110.

A block offset refers to a distance in blocks from the beginning of a storage object, such as a volume. Block addresses, by contrast, used within flexible volume 110 refer to block offsets within volume container 120. Since a volume container 120 contains every block within a flexible volume 110, there are two ways to refer to the location of a particular block. The PVBN specifies the location of a block within the aggregate 100. The VVBN specifies the offset of the block within the container file. When a block in a file is requested, flexible volume 110 translates the block offset into a VVBN. The VVBN is then passed from flexible volume 110 to volume container 120. Volume container 120, in turn, translates the VVBN to a PVBN. The PVBN is then used to access the requested block in physical storage 130. When a PVBN is initially written, a block pointer for the PVBN in flexible volume 110 is written to include (e.g., in a cache) the PVBN for the VVBN. Thus, when the requested block is required, the flexible volume 110 can use the stored PVBN to access physical storage 130.

The file system aggregate 100 can define a file as a tree of indirect blocks. Each indirect block in the tree typically has a fixed span, i.e., a fixed number of entries, each pointing to another block in the tree. Extents are represented using an entry for each block within the extent. An extent generally refers to a contiguous group of one or more blocks. As a result, the amount of indirect block metadata is typically linear with respect to the size of the file. Additionally, disk gardening techniques, such as segment cleaning, file reallocation, etc., may require caching PVBN pointers in VVBN blocks. The aggregate 100 is configured to use a predetermined block size for all internal operations. The aggregate 100, for example, uses 4 KB (e.g., 4096 bytes) blocks for both VVBN and PVBN, as do client-side file systems for file block numbers (FBN). Block boundaries are expected to occur every 4 KB from an initial offset (e.g., FBN 0). The file system can offset individual files based on these block boundaries, and take advantage of the block size and alignment to increase performance of input/output ("I/O") operations, for example, performing I/O operations that are a multiple of 4 KB and aligning these operations to the beginning of a file.

The file system comprises various modules for providing identification, collection, packing and writing functionalities to address sub-4K block chunks. In the example illustrated in FIG. 2, the aggregate 100 includes a Feeder Module 102, which acts as a logical module to detect and prepare a collection of all sub-4K blocks that are possible candidates for packing. The individual code paths of data intended to be packed identifies and tags sub-4K blocks appropriately at the front-end and, for example, when a message comes across potential blocks. Tagging a sub-4K block includes, for example, populating a newly added field in the block data with the size of valid data in the sub-4K block, and then enqueuing it to a global structure for a Packing Engine to find. In a write message code path which utilizes data packing, if the IO is on the last file block number (fbn) of the file, and the data length field (DataLen) indicates less than 4K (i.e., it is the tail end of the file), then such blocks are tagged. By comparison, in a compression code path which utilizes data packing, once the data has been compressed, a compression engine returns the length of the compressed block along with compressed data. If the compressed data length is less than 4 KB, those sub-4K blocks will be tagged. Moreover, in a truncate code path which utilizes data packing, a file is truncated in such a way that if the tail end does not completely fill the 4K block, the file system loads such buffers and completes a block zero ("bzero") for the rest of the block. In addition to zeroing out the rest of the block of memory ("bzeroing"), the truncate code path will also tag such blocks for packing. In a snapshot code path, as a snapshot block is read, if the tail ends of the files are not full 4K blocks, those bdatas will be tagged for packing.

Given a list of possible packing candidates obtained from the Feeder Module 102, a Packing Engine Module 104 reviews the list of candidates and creates one or more sets of candidates, wherein each set is "optimally packed" as close as possible to 4 KB of data. Standard combinatorial optimization smart algorithms can be used by Packing Engine Module 104 of FIG. 2 to efficiently pack the data in each packed block. Output from the Packing Engine Module 104 includes a list of 4K blocks, where each enumerated 4K block is associated with a distinct set and, thus, will contain data from multiple blocks which were received as input. Since file system workload during this stage of packing is directly proportional to the number of objects packed in a block, it is desirable for some implementations that the variance in number of packed objects between packed blocks be kept low. For example, if 10 sub-4K blocks are slated to be packed into two packed blocks, it is desirable to have the sub-4K blocks split into a set of 4 and a set of 6, for example, instead of sets of 2 and 8. The Packing Engine Module 104 also stores sufficient metadata information for each sub-4K block in a set, including lost-write context for each chunk in a packed block. This metadata contains information for reconstructing the data along with a unique signature of the data present in each chunk.

Figure 3:
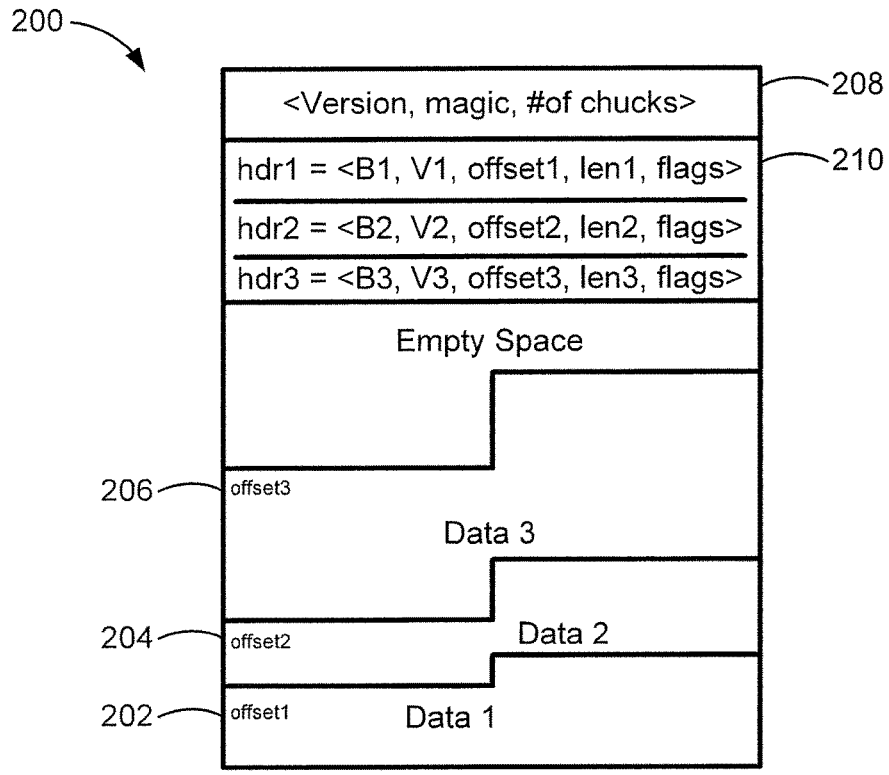
FIG. 3 is a schematic illustration of a representative "packed block" layout for a data file in accordance with aspects of the present disclosure.

FIG. 3 illustrates a representative "packed block" layout, designated generally as 200, for a data file system. As indicated above, a packed block refers to a 4K block which is configured to store multiple data fragments (e.g., a plurality of sub-4K data chunks) and metadata for the stored fragments. By way of non-limiting example, packed block 200 of FIG. 3 has been packed with three data chunks, namely Data 1, Data 2, and Data 3 respectively designated 202, 204 and 206, from various 4K blocks that originated, for example, from three separate volumes with buftree_ids B1, B2 and B3, respectively. Packed block 200 is also provided with a packed block header 208 with index node information and a packed data header 210 with data chunk information. "Packing" a packed block refers to placing multiple fragments/chunks in a 4K block, as described hereinbelow, and then write-allocating the packed block on disk. A packing factor, on the other hand, refers to the average number of chunks packed in a 4K block. So, if a group of packed blocks contains, on average, three chunks per block, then the packing factor is three for that grouping. Note that the contents in the packed block 200 are filled from end, and appear in reverse order from their corresponding packed header information. That is, the first data chunk 202, which is from volume B1, has file block number (fbn) V1, and length len1, is located at offset location offset1 at the end of the packed block 200 yet corresponds to the first header hdr1 in the packed data header 210 of FIG. 3.

For some implementations, only data for user files within the same virtual volume will be packed together in a single 4K packed block. Optionally, only data with similar nature will be packed together. Since the data chunks become a single entity when packed into a packed block, it is oftentimes desirable that all of the chunks in a packed block have the same kind of property. For instance, some implementations avoid packing hot and cold data together in the same packed block. As another example, some implementations avoid packing data which resides in SSD with data that resides on HDD.

A Block Writing Module 106, which may comprise a modified Consistency Point (CP) write allocation front-end component and/or a modified CP write allocation back-end component, is operable to do the packing work for the file system. Prior to said packing work, the Feeder Module 102 of FIG. 2 is operable to enqueue a list of relevant buffers and bdatas which require packing; this list can hang off the volume structure for any flexvol (e.g., a Flexible Volume 110 of FIG. 2) which participates in the CP packing operations. To ensure savings in disk writes, the CP components of Block Writing Module 106 typically write only a single packed block for 'N' packed chunks. Thus, writes to disk can be reduced by a factor of 'N' (where 'N' is the average packing factor during CP). In order to construct and write a packed block, Block Writing Module 106 allocates a VVBN for each packed chunk as this information is stored as lost-write information in the packed header for the packed chunk. The packed block is constructed after each of the constituting buffers has been assigned a corresponding lost-write context.

Figure 4:
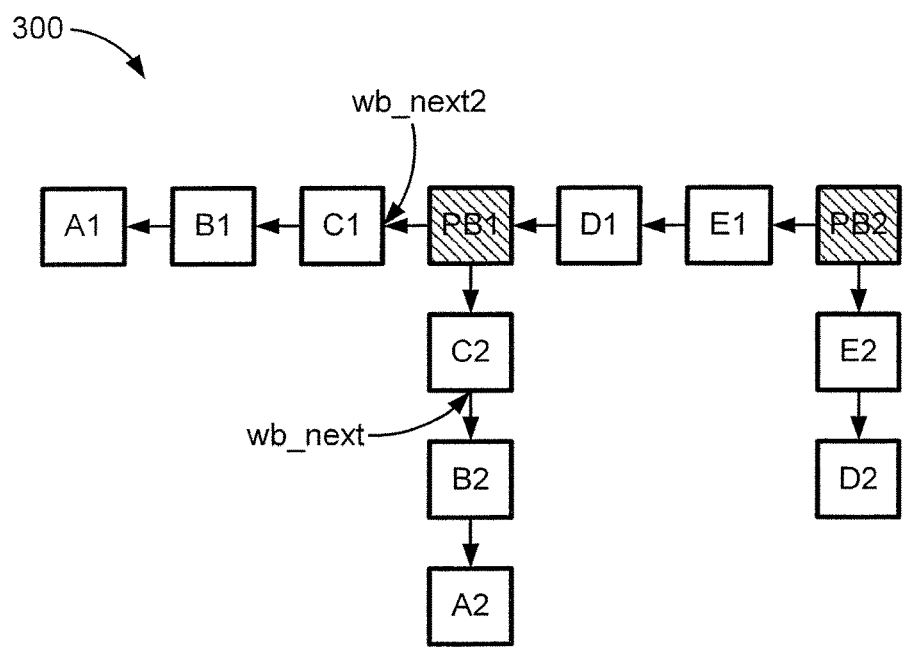
FIG. 4 is a schematic diagram illustrating an example of a "packed extent" list for a representative file system in accordance with aspects of the present disclosure.

For the packing phase performed by Block Writing Module 106, at which write allocation of packed data occurs, a new CP pack phase is added before a normal clean phase, i.e., before any of the regular modes are cleaned. From a front-end perspective, it appears as a CLEANING_NORMAL phase and can be visualized as having two sub-states: (a) a packing phase, and (b) a normal cleaning phase. FIG. 4 schematically illustrates an example of a packed extent list, designated generally as 300, which is representative of the work performed during the packing phase of the CP. Packed extent list 300 of FIG. 4 comprises twelve 4K blocks with first and second packed blocks PB1 and PB2 and ten blocks A1-E1 and A2-E2 which need packing. Each packed block PB1 and PB2 holds a linked list of the constituting blocks, e.g., via wb_next2, which is used by CP code to walk over the extents. Each packed block also holds a linked list of the constituting blocks, e.g., via wb_next, which hangs off the packed buffer and is used to walk and prepare the packed contents.

At the start of the packing phase, each participating virtual volume that has a packing list to be cleaned is assigned a packing cleaner message. The job of this packing message is to walk through the list of buffers and try to fit those contents into packed data blocks. Similar to normal cleaning, this packing message prepares an extent list of the buffers which are going to get packed in each iteration of the message. At the start of each iteration, a 4K block of data is allocated which is going to hold contents of the packed block. The packing message then walks through the chunk list, picking each chunk from the front and deciding if it can fit into the current packed block. If the packed block has sufficient space to accommodate a picked chunk, a corresponding virtual volume buffer is added to the extent list. If the packed block does not have sufficient space to accommodate a picked chunk, then a new 4K block of data is allocated and the picked chunk is placed in the new block. The packed extent list of FIG. 4 is suggestive of the packing message after one complete iteration.

Once the extent list is prepared, CP code walks through each virtual volume buffer (e.g., for blocks A1-E1 and A2-E2 of FIG. 4) and allocates a respective VVBN to said buffer. While walking through the extent list in the VVBN allocation phase, when packed buffers are encountered, such buffers are skipped. A newly assigned VVBN is stored in the packing info structure which hangs off the virtual volume buffer. Once new VVBNS have been assigned to the buffers, cleaner code moves to the PVBN allocation phase. In the PVBN allocation phase, the extent list is traversed skipping virtual volume buffers that are encountered. When a packed block is encountered (e.g., packed blocks PB1 and PB2 of FIG. 4), a PVBN is allocated for the packed block. Along with allocating a PVBN for the packed block, the cleaner code walks through the linked list hanging off the packed buffer (e.g., linked via wb_next) for all the constituting virtual volume buffers. Cleaner code concomitantly retrieves newly assigned VVBNS for the virtual volume buffers. Once <V, P> pairs are provided for each of chunk that is going into a particular packed block, appropriate headers in the packed block are updated and the packed block is sent to disk. This code also stamps the virtual volume buffers with a flag to denote that the contents for this block have been packed and already written to disk.

Once all of the buffers are packed, CP moves forward to the regular cleaning of dirty buffers and modes. During regular cleaning of normal modes, if CP comes across a virtual volume buffer whose contents have already been packed, instead of doing the actual work of cleaning and allocating a <V,P> pair, CP will "fake clean" the buffer. This fake cleaning includes updating the virtual volume parent and container with the packed <V, P> and then enqueuing the buffer in the waffinity write done queues. Write return for the packed blocks happens in RAID and the dummy buffer used to write the packed contents are thrown away on write completion.

For CP WABE of the Block Writing Module 106, CP infrastructure allocates new PVBNS with a given refcount. Specifically, while the PVBN is allocated in this CP, the PVBN starts life with a given refcount of 'N' instead of 0. For example, a PVBN 'P' that is assigned to a packed block containing five chunks will have a refcount of 4 and active bitmap set to 1 as part of write allocation. This updating of refcount is completed along with setting activemap bit as part of an apply maps message. Aggregate's refcount file is NDX0 unlike virtual volume refcount file and will be cleaned in the allocation loop phase of CP along with active bitmap file. UPBC creation will also load necessary refcount files similar to other bitmap files during pbkt creation.

Apart from packing of multiple sub-4K blocks and placing them as individual chunks in a single packed 4K block, additional optimizations can be made to the packing workflow. For example, CP has infrastructure to allocate blocks out of CP; since snapshot blocks already have associated therewith a VVBN and necessary lost-write context, such blocks can be packed earlier and, thus, do not need to wait till CP for packing. As another example, when CP is copying individual chunks into a particular 4K block, CP can be configured to detect if a specific chunk being copied already exists in that block. In such cases, CP can avoid copying the chunk and only put the necessary lost-write and header in the block and adjust the offset and length accordingly. This option helps to create more space in the 4K block and, thus, allows CP to pack more chunks into the block. It is also possible to detect and avoid chunk copy if the chunk being copied is a substring of a chunk that is already present in the block. This enables the file system to do block sharing on a substring basis within a block.

Other optional optimizations are available for the packing workflow. By way of non-limiting example, since the CP packing infrastructure can pack arbitrary data together, and all of the metadata required to read back and reconstruct a chunk into a full 4K block is stored in the block header, additional space efficiency can be realized by compressing full 4K blocks. Once compressed, a compressed 4K block is packed along with a flag in the packed header indicating that data needs to be decompressed. Data can be uncompressed while reading from disk. This optimization achieves additional space savings. This technique does not require enabling any storage efficiency in the volumes, and can help pack data which is 4K-block-aligned or full. It is expected to be beneficial in workloads that do not have storage efficiency but contain large files which contain highly compressible data.

Another optional optimization for the packing workflow includes a Read-Modify-Write (RMW) feature for compressed CGs. Since the metadata required to reconstruct a chunk of data is contained in the packed header, it is possible to use object packing to solve RMW problems for compressed CGs of 8K in length. A typical 8K CG looks like {<VH, PH> <V1, P1>}, where VH is the compressed header. In such CGs, if P1 is stored in a packed block, the writes on the VH/PH can be absorbed because, even after the header is overwritten, a read on P1 indicates that it is a packed compressed block. Since 8K CGs are fbn aligned, the file system protocol can determine which data to look at in the uncompressed, unpacked block. Similarly, if an overwrite comes on P1, V1, P1 can be shifted to the header portion. Alternatively, for such CGs, the CG can be constructed as {<V2, P1> <V2, P1>}—i.e., both slots contain the PVBN for the packed block. In such a case, both blocks are identical and can absorb writes on any of the fbns.

Since a packed block is shared by multiple VVBNS that can be within the same virtual volume or across multiple virtual volumes, a lost-write context operation is provided to uniquely identify the contents with respect to each VVBN. Each VVBN, from its logical context, is able to provide a unique signature as an expected context, and RAID is able to detect and match it against the block and return the data or, if it does not match, an error output. Logical virtual volume lost write context is stored as an array in the header of the 4K payload of the packed block. A new on-disk bit in the RAID context identifies a packed block and acts as a hint to RAID to look for the context in 4K payload as opposed to getting it from RAID context area. Since there is one instance of a <btid, vvbn> in a 4K block, context checking is completed by iterating over all the contexts present in the header. If a match is found, data is returned successfully. If none of the entries in the header match with the passed expected context, the buffer is marked either as a context mismatch or an appropriate block reallocation state transition is triggered. To further harden the block verification scheme and avoid looking into the 4K payload, where there is a possibility that a user data may look like a valid packed block header, packed blocks have a context of their own in the raid context area. This context can be made up of <Refcount_fileid, pvbn, bc_notflexvol_flag=0>. A first level check is done on this context. If the raid context has the packed bit set, then its raid context must have <Refcount_fileid, pvbn, bc_notflexvol_flag=0>. If it matches, RAID context is derived from the 4K payload.

Figure 5:
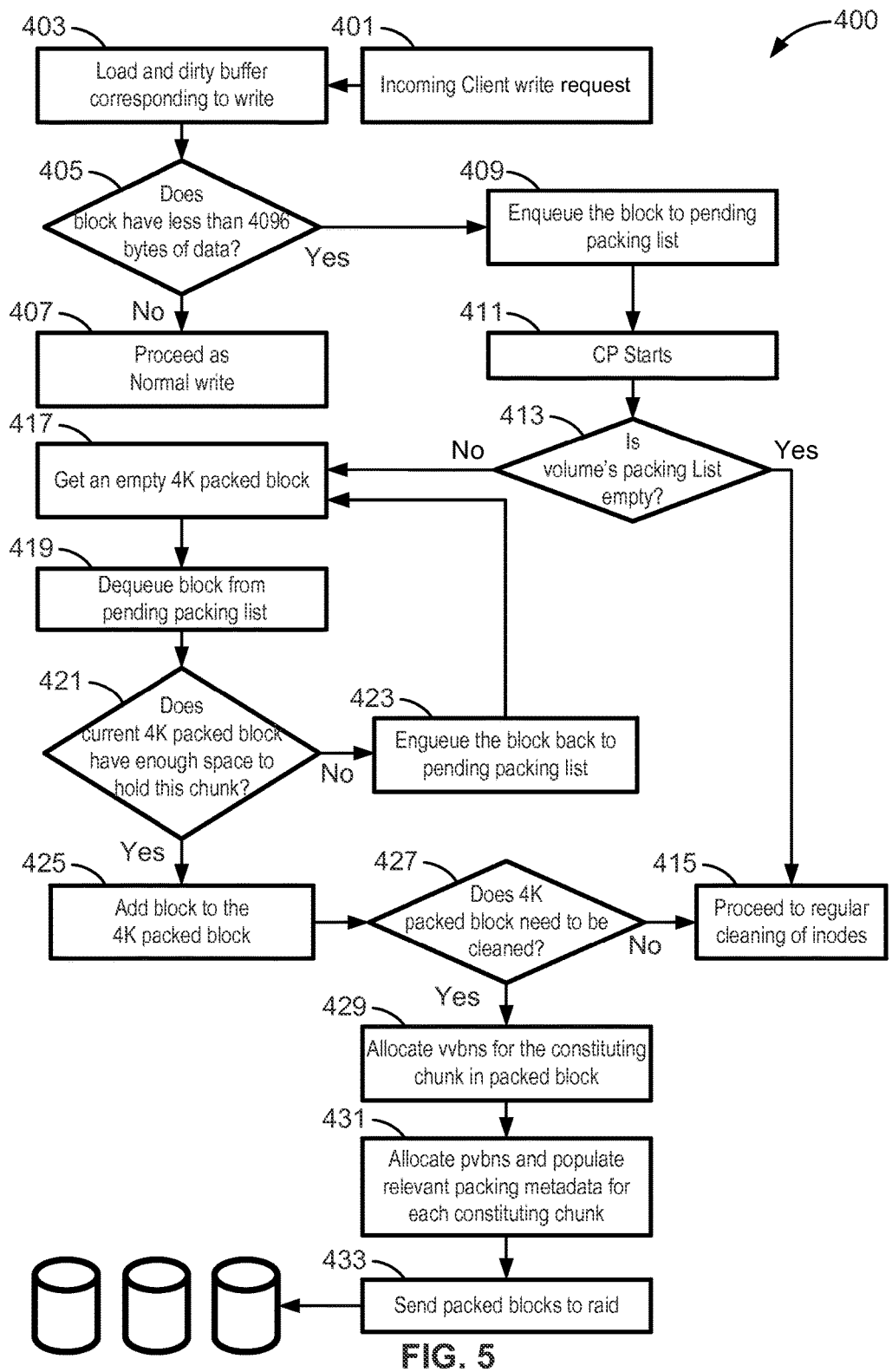
FIG. 5 is a flow chart illustrating a representative method or work flow process for addressing data blocks in a mass data storage filing system in accordance with aspects of the present disclosure.

With reference now to the flow chart of FIG. 5, there is shown a novel method or work flow process, designated generally as 400, for addressing data chunks in a mass data storage filing system. FIG. 5 can be indicative of a method for identifying, collecting, packing and writing sub-4K blocks of data in a data storage file system. FIG. 5 can be representative of an algorithm that corresponds to instructions that are stored, for example, in a main memory and executed, for example, by a CPU (e.g., of storage server 12 of FIG. 1) to perform any or all of the above or below described functions associated with the disclosed concepts. The method 400 is described with reference to the various aspects and features shown in FIGS. 1-4 of the drawings; such reference is being provided purely by way of explanation and clarification.

The method 400 begins at block 401 with receiving, e.g., from a client computing device by a storage controller of the data storage system, a write request to write a data file to the data storage system. Once the write request is received, the method 400 loads and dirties one or more buffers corresponding to the write request, as indicated at block 403. A dirty buffer refers to blocks in the database buffer cache that are changed but not yet written to disk. At this juncture, the file system does not write the dirty buffer to disk, but instead waits until execution of a consistency model event, e.g., a consistency point (CP), of the system. At block 405, the data file is reviewed, e.g., by a Feeder Module 102 on storage controller in the manner described above, to identify and collect sub-4K data chunks, if any, within the data file. If the data file does not have any sub-4K data chunks (Block 407=NO), the method 400 proceeds to block 407 to conduct a normal write of the data file to disk.

If the data file does have at least one sub-4K data chunks (Block 407=YES), the method 400 proceeds to block 409 and enqueues the sub-4K data chunk(s) to a pending packing list, e.g., via Feeder Module 102. At block 411, a consistency point (CP) process is started. To implement a consistency point, the file system allocates new block numbers to incoming writes, and writes new data to unallocated blocks on disk. For example, a new consistency point occurs when the fsinfo block is updated by writing a new root inode for the inode file. The method 400 then determines, at block 413, if the packing list for the write-request-designated volume to which the data file is to be written is empty. If the volume's packing list is empty (Block 413=YES), the method 400 proceeds to block 415 with a regular cleaning of inodes.

With continuing reference to FIG. 5, if the volume's packing list is not empty (Block 413 NO), the method 400 proceeds to block 417 by identifying, e.g., by a Packing Engine Module 104 of storage controller, a 4K block that can be packed with multiple sub-4K data chunks and has available sufficient storage space to store the sub-4K data chunk(s) in the subject data file. Identifying a 4K block for packing may comprise, for example, creating a new packed block and a respective index node (inode) with a refcount for the packed block. Once a packable 4K block is identified, the sub-4K block is dequeued from the pending packing list at block 419 and, concomitantly, it is determined at block 421 if the packable 4K block has sufficient storage space available to store the dequeued data chunk. If said 4K block does not have sufficient storage space available to store the dequeued data chunk (Block 421=NO), the method 400 proceeds to block 423 and enqueues that sub-4K block back to the pending packing list and then returns to block 417 to find another 4K block available for packing.

If the determination conducted at block 421 indicates that the packable 4K block does have sufficient storage space available to store the dequeued data chunk (Block 421=YES), the method 400 proceeds to block 425 and places, e.g., by Block Writing Module 106 of storage controller, the dequeued sub-4K data chunk in the 4K block, and updates the packed data header to include a corresponding data length and a respective offset identifying the location of the newly packed data chunk within the packed block. Subsequently, at block 427, the method 400 determines if the packed block needs to be cleaned; if not (Block 427=NO), the method will proceed to regular cleaning of modes, as indicated at block 415. Conversely, if the packed block does need to be cleaned Block 427=YES), disk block numbers are allocated and the data is flushed to disk. That is, virtual volume block numbers (VVBNs) are allocated for the constituting chunks in the packed block at block 429, and physical volume block numbers (PVBNS) are allocated for the constituting chunks in the packed block at block 431. Block 431 also includes populating the packed block with relevant meta data for each chunk and, at block 433, the packed block is sent to disk.

In some embodiments, the method 400 includes at least those steps enumerated above, carried out in the order illustrated in FIG. 5. It is also within the scope and spirit of the present disclosure to omit steps, include additional steps, and/or modify the order presented in the drawings. In this regard, the method 400 may include any of the features, options, and alternatives described above and below.

The disclosed file system protocols, in at least some embodiments, help to simplify management of data storage in mass data storage systems and help to achieve space savings by efficiently packing 4K blocks. For at least some embodiments, cost of implementation is relatively inexpensive with minimal penalty for detecting sub-4K blocks. Disclosed file system protocols designs are data agnostic and sufficiently flexible to allow sharing and packing for any kind of data without concern for the nature of the data that is being shared. For at least some implementations, the disclosed file system protocols work on both snapshots and AFS, are able to share and pack data across virtual volumes, and work with other features without significant constraints.

The write-anywhere file system has the capability to generate a snapshot of its active file system. An "active file system" is a file system to which data can be both written and read, or, more generally, an active store that responds to both read and write I/O operations. It should be noted that "snapshot" is a trademarked designation, and is used for purposes of this description to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the file system, a PCPI is an active file system image that contains complete information about the file system, including all metadata. A PCPI can also include other information (e.g., metadata) about the active file system at the particular point in time for which the image is taken.

The following exemplary features and configurations are not intended to represent every embodiment or every aspect of the present disclosure. The above features and advantages, and other features and advantages of the present disclosure, will become more readily apparent from the following examples. In this regard, each of the disclosed systems, methods, devices, protocols, etc., including those illustrated in the figures, may comprise any of the features, options, and alternatives described herein with respect to the other embodiments, singly and in any combination, unless explicitly disclaimed or logically prohibited.

Aspects of the present disclosure are directed to methods for storing data blocks in mass data storage file systems. For example, a method for storing blocks of data in a file system is presented. This method includes, in any order and in any combination with any of the optional features disclosed herein: receiving, from a client computing device by a storage controller implementing a file system protocol, a write request to write a data file to a storage module of the data storage system; determining, by the storage controller in response to the write request, whether the data file includes at least one "sub-K" data chunk, which is a data chunk with a size that is less than a predetermined byte value (e.g., a sub-4K chunk that is less than approximately four kilobytes (KB)); identifying, by the storage controller in response to the data file including at least one sub-K data chunk, a packed block that is configured to store a plurality of sub-K data chunks and has sufficient storage space available to store the at least one sub-K data chunk; and, placing, by the storage controller in the packed block, the at least one sub-K data chunk and metadata with a corresponding data length and a respective offset identifying a location of the at least one sub-K data chunk in the packed block.

For any of the disclosed methods, identifying the packed block may include creating a new packed block and a respective index node (mode) with a refcount for the packed block. Additionally or alternatively, identifying the packed block may include identifying an existing packed block with sufficient available storage space to store the at least one sub-K data chunk. Optionally, the packed block includes a header that stores metadata for all of the sub-K data chunks stored in that packed block. The metadata includes a respective data length and offset for each of the stored sub-K data chunks. The metadata stored in the header may also include a respective lost-write context for each of the stored sub-K data chunks. As another option, determining whether the data file includes a sub-K data chunk may include parsing the data file into one or more four-kilobyte blocks (4K block) and, if any data remains, a sub-4K data chunk.

The methods disclosed herein may further comprise: enqueuing, by the storage controller in response to the data file including at least one sub-K data chunk, the at least one sub-K data chunk to a pending packing list. When the write request designates a volume within the storage module to which the data file is to be written, the method may comprise: determining whether a volume packing list associated with the designated volume is empty; if the volume packing list is not empty, cleaning modes for the packed block; and if the volume packing list is empty, obtaining an empty packed block for the identified packed block into which the sub-4 chunk is stored. In addition, if the volume packing list is empty, the method may also comprise dequeuing the at least one sub-K data chunk from a pending packing list after obtaining the empty packed block. Moreover, if the volume packing list is empty, the method may further comprise: determining whether the packed block has sufficient storage space available to store the sub-K data chunk; and, if the packed block does not have available sufficient storage space, enqueuing the sub-K data chunk back to the pending packing list.

For any of the disclosed methods, placing the sub-K data chunk in the packed block can be responsive, at least in part, to the volume packing list being empty and the packed block having sufficient storage space. The methods disclosed herein may further comprise: loading and dirtying a buffer corresponding to the request to write, and writing the packed block to the storage module of the data storage system after the sub-K data chunk is placed in the packed block. As another option, the methods disclosed herein may further comprise: determining whether the packed block needs to be cleaned; if the packed block does not need to be cleaned, cleaning modes for the packed block; and, if the packed block does need to be cleaned, allocating virtual volume block numbers (VVBNs) and physical volume block numbers (PVBNS) for the packed block.

Other aspects of the present disclosure are directed to non-transitory machine-readable media having stored thereon instructions for performing methods comprising machine executable code. In one example, the machine readable code, when executed by a storage controller of a data storage system, causes the data storage system to: receive a write request to write a data file to a storage module of a data storage system; determine whether the data file includes at least one sub-K data chunk with a size that is less than a predetermined byte value (e.g., less than approximately 4 KB); in response to a determination that the data file does include a sub-K data chunk, identify a packed block that is configured to store a plurality of sub-K data chunks and has available sufficient storage space to store the sub-K data chunk; and, place in the packed block the sub-K data chunk and a corresponding data length and a respective offset identifying a location of the at least one sub-K data chunk.

According to yet other aspects of the presented disclosure, mass data storage systems are disclosed. In an example, a disclosed data storage system includes a storage module, which includes one or more physical storage devices, and a host server with a storage controller communicatively coupled to the storage module. The system also includes a memory device that is communicatively coupled to the storage controller and has one or more memory locations addressable by the storage controller. An operating system is resident in at least one of the memory locations of the memory device and is executable by the storage controller to perform a filing system protocol. The filing system protocol includes: receiving a write request to write a data file to the storage module of the data storage system; determining whether the data file includes at least one sub-K data chunk with a size less than approximately four KB; in response to a determination that the data file does in fact include a sub-K data chunk, identifying a packed block that stores multiple sub-K data chunks and has available sufficient storage space to store the sub-K data chunk in the data file; and, placing in the packed block the at least one sub-K data chunk and a corresponding data length and a respective offset identifying a location of the at least one sub-K data chunk in the packed block.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and aspects.

What is claimed:

1. A method for storing blocks of data in a file system, the method comprising:
   receiving, from a client computing device by a storage controller implementing a file system protocol, a write request to write a data file to a storage array;
   determining, by the storage controller in response to the write request, whether the data file includes at least one data fragment comprising a sub-K data chunk with a size less than a predetermined byte value used for a block size by the file system for storing data;
   identifying, by the storage controller in response to the data file including at least one sub-K data chunk, a packed block configured to store a plurality of sub-K data chunks and having available sufficient storage space to store the at least one sub-K data chunk for the write request; and
   placing, by the storage controller in the packed block, the at least one sub-K data chunk with a corresponding data length for the at least one sub-K data chunk and a respective offset identifying a location of the at least one sub-K data chunk in the packed block as metadata for the at least one sub-K data chunk;
   wherein the packed block comprises a block of the predetermined byte value used by the file system and configured to store multiple data fragments, each with a sub-K data chunk; and wherein the packed block includes a header configured to store metadata for each sub-K data chunk of the multiple data fragments, the metadata providing a respective data length and an offset indicating a location of each sub-K data chunk within the packed block.

2. The method of claim 1, wherein the identifying the packed block includes creating a new packed block and a respective index node (inode) with a refcount for the packed block.

3. The method of claim 1, wherein the identifying the packed block includes identifying an existing packed block with sufficient storage space available to store the at least one sub-K data chunk.

4. The method of claim 1, wherein the metadata stored in the header of the packed block further includes a respective lost-write context for each of the stored sub-K data chunks.

5. The method of claim 1, wherein the determining whether the data file includes at least one sub-K data chunk includes parsing the data file into one or more four-kilobyte blocks (4K block) and, if any data remains, at least one sub-4K data chunk.

6. The method of claim 1, further comprising enqueuing, by the storage controller in response to the data file including at least one sub-K data chunk, the at least one sub-K data chunk to a pending packing list.

7. The method of claim 1, wherein the write request designates a volume within the storage module to which the data file is to be written, the method further comprising:
   determining whether a volume packing list associated with the designated volume is empty;
   if the volume packing list is not empty, cleaning inodes for the packed block; and
   if the volume packing list is empty, obtaining an empty packed block for the identified packed block.

8. The method of claim 7, further comprising, if the volume packing list is empty, dequeuing the at least one sub-K data chunk from a pending packing list after obtaining the empty packed block.

9. The method of claim 8, further comprising, if the volume packing list is empty:
   determining whether the packed block has sufficient storage space available to store the at least one sub-K data chunk; and
   if the packed block does not have available sufficient storage space, enqueuing the at least one sub-K data chunk back to the pending packing list.

10. The method of claim 9, wherein the placing the at least one sub-K data chunk in the packed block is responsive, at least in part, to the volume packing list being empty and the packed block having available sufficient storage space.

11. The method of claim 1, further comprising loading and dirtying a buffer corresponding to the request to write.

12. The method of claim 1, further comprising:
   determining whether the packed block needs to be cleaned;
   if the packed block does not need to be cleaned, cleaning inodes for the packed block; and
   if the packed block does need to be cleaned, allocating virtual volume block numbers (VVBNs) and physical volume block numbers (PVBNS) for the packed block.

13. The method of claim 1, further comprising writing the packed block to the storage module of the data storage system.

14. A non-transitory machine-readable medium having stored thereon instructions for performing a method comprising machine executable code which, when executed by a host central processing unit (CPU) of a data storage system, causes the data storage system to:
   receive a write request to write a data file to a storage module of the data storage system;
   determine whether the data file includes at least one data fragment comprising a sub-K data chunk with a size less than a predetermined byte value used for a block size by the file system for storing data;
   in response to a determination that the data file includes at least one sub-K data chunk, identify a packed block configured to store a plurality of sub-K data chunks and having available sufficient storage space to store the at least one sub-K data chunk for the write request; and
   place in the packed block, the at least one sub-K data chunk with a corresponding data length for the at least one sub-K data chunk and a respective offset identifying a location of the at least one sub-K data chunk in the packed block as metadata for the at least one sub-K data chunk;
   wherein the packed block comprises a block of the predetermined byte value used by the file system and configured to store multiple data fragments, each with a sub-K data chunk; and wherein the packed block includes a header configured to store metadata for each sub-K data chunk of the multiple data fragments, the metadata providing a respective data length and an offset indicating a location of each sub-K data chunk within the packed block.

15. The non-transitory machine readable medium of claim 14, wherein identifying the packed block includes:
   creating a new packed block and a respective index node (inode) with a refcount for the packed block; or
   identifying an existing packed block with sufficient storage space available to store the at least one sub-K data chunk.

16. The non-transitory machine readable medium of claim 14, wherein determining whether the data file includes at least one sub-K data chunk includes parsing the data file into one or more four-kilobyte blocks (4K block) and, if any data remains, at least one sub-4K data chunk.

17. The non-transitory machine readable medium of claim 14, wherein the stored instructions further cause the system to:

determine whether the packed block needs to be cleaned;

in response to a determination that the packed block does not need to be cleaned, cleaning of inodes for the packed block; and in response to a determination that the packed block does need to be cleaned, allocate virtual volume block numbers (VVBNs) and physical volume block numbers (PVBNS) for the packed block.

18. A computing device comprising:

a memory containing machine readable medium comprising machine executable code having stored thereon instructions for performing a method of storing blocks of data in a file system; and a processor coupled to the memory, the processor configured to execute the machine executable code to cause the processor to:

receive a write request to write a data file to a storage module of the data storage system;

determine whether the data file includes at least one data fragment comprising a sub-K data chunk with a size less than a predetermined byte value used for a block size by the file system for storing data;

in response to a determination that the data file includes at least one sub-K data chunk, identify a packed block configured to store a plurality of sub-K data chunks and having available sufficient storage space to store the at least one sub-K data chunk for the write request; and place in the packed block, the at least one sub-K data chunk with a corresponding data length for the at least one sub-K data chunk and a respective offset identifying a location of the at least one sub-K data chunk in the packed block as metadata for the at least one sub-K data chunk;

wherein the packed block comprises a block of the predetermined byte value used by the file system and configured to store multiple data fragments, each with a sub-K data chunk; and wherein the packed block includes a header configured to store metadata for each sub-K data chunk of the multiple data fragments, the metadata providing a respective data length and an offset indicating a location of each sub-K data chunk within the packed block.

19. The computing device of claim 18, wherein identifying the packed block includes:

creating a new packed block and a respective index node (inode) with a refcount for the packed block; or identifying an existing packed block with sufficient storage space available to store the at least one sub-K data chunk.

20. The computing device of claim 18, wherein determining whether the data file includes at least one sub-K data chunk includes parsing the data file into one or more four-kilobyte blocks (4K block) and, if any data remains, at least one sub-4K data chunk.

* * * * *